(12) United States Patent
Melzer et al.

(10) Patent No.: US 8,509,322 B2
(45) Date of Patent: Aug. 13, 2013

(54) SYSTEM, METHOD AND DEVICE OF ADJUSTING A WIRELESS COMMUNICATION SIGNAL

(75) Inventors: Ezer Melzer, Tel Aviv (IL); Sharon Levy, Hadera (IL); Daniel Yellin, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 2020 days.

(21) Appl. No.: 11/392,748

(22) Filed: Mar. 30, 2006

(65) Prior Publication Data

US 2007/0230588 A1    Oct. 4, 2007

(51) Int. Cl.
*H04K 1/10* (2006.01)
*H04L 27/28* (2006.01)

(52) U.S. Cl.
USPC .......................... 375/260; 375/262; 375/220

(58) Field of Classification Search
USPC .................................. 375/358, 260, 333, 346
See application file for complete search history.

(56) References Cited

U.S. PATENT DOCUMENTS

| 6,445,747 | B1 * | 9/2002 | Jafarkhani et al. | 375/285 |
| 6,512,797 | B1 * | 1/2003 | Tellado et al. | 375/261 |
| 2004/0218689 | A1 * | 11/2004 | Akhtman | 375/296 |
| 2006/0115010 | A1 * | 6/2006 | Rog et al. | 375/260 |

* cited by examiner

*Primary Examiner* — Daniel Washburn
*Assistant Examiner* — Qutbuddin Ghulamali
(74) *Attorney, Agent, or Firm* — Shichrur & Co.

(57) ABSTRACT

Embodiments of the present invention provide a system, method, and apparatus of adjusting a wireless communication signal. In some demonstrative embodiments the method may include, for example, allocating a plurality of spectral components to an adjustment signal based on a spectral range of the wireless communication signal to be adjusted by the adjustment signal, wherein one or more of the spectral components are included in the spectral range. Other embodiments are described and claimed.

21 Claims, 2 Drawing Sheets

SYSTEM, METHOD AND DEVICE OF ADJUSTING A WIRELESS COMMUNICATION SIGNAL

BACKGROUND OF THE INVENTION

A Peak-to-Average-Power-Ratio (PAPR) of a signal to be transmitted over a wireless communication link may be used to measure variations in the signal amplitude. The PAPR may be defined in relation to a ratio of the peak amplitude of the signal to the average amplitude of the signal.

It may be desirable to reduce the PAPR of the signal, e.g., in order to enable a more efficient utilization of one or more elements, e.g., a power amplifier, in a transmission chain for transmitting the signal. The reduction in the PAPR may result in an increase in the throughput of the communication link at a fixed input power. It may also be desirable that the PAPR reduction will not generate interference, which may reduce the throughput of other communication links using different frequency resources than the communication link.

The wireless communication signal may be adjusted using an adjustment signal to generate an adjusted signal having a reduced PAPR. The adjustment signal may be generated using a predefined set of spectral components ("tones").

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
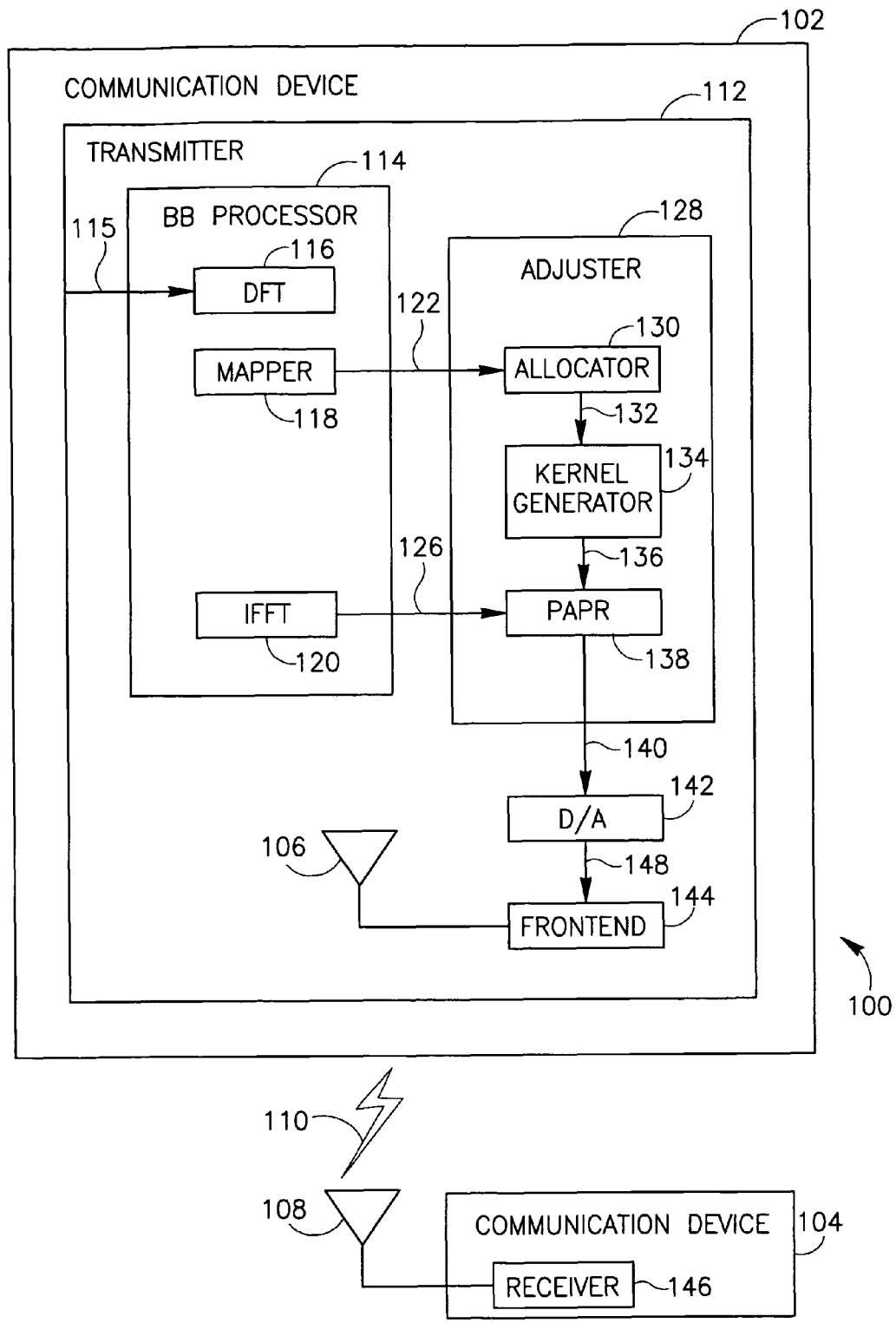
FIG. 1 is a schematic illustration of a wireless communication system in accordance with some demonstrative embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of signals" may include two or more signals.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) system, a Wireless Metropolitan Area Network (WMAN) communication system, and/or in any other unit and/or device. Units of a communication system intended to be included within the scope of the present invention include, by way of example only, modems, Mobile Units (MU), Access Points (AP), wireless transmitters/receivers, and the like.

Types of WLAN and/or WMAN communication systems intended to be within the scope of the present invention include, although are not limited to, WLAN and/or WMAN communication systems as described by "IEEE-Std 802.16, 2004 Edition, Air Interface for Fixed Broadband Wireless Access Systems" standard ("the 802.16 standard"), and more particularly in "IEEE-Std 802.16e, 2005 Edition, Physical and Medium Access Control Layers for Combined Fixed and Mobile Operation in Licensed Bands"; by a $3^{rd}$ Generation Partnership Project (3GPP) technical report, specification or standard, e.g., "3rd Generation Partnership Project, Technical Specification Group Radio Access Network: Physical Layer Aspects for Evolved UTRA, Release 7, Mar. 20, 2006" ("the 3 GPP specification"), and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to adjusting a wireless communication signal. However, embodiments of the invention are not limited in this regard, and may include, for example, adjusting a block, a data portion, a packet, a data sequence, a flame, a data signal, a preamble, a signal field, a content, an item, a message, a protection frame, a transmission or the like.

Reference is made to FIG. 1, which schematically illustrates a wireless communication system 100 in accordance with some demonstrative embodiments of the present invention.

According to some demonstrative embodiments of the invention, communication system 100 may include a WLAN/WMAN system. System 100 may include a first communication device 102 able to communicate with a second communication device 104 over a communication channel 110. For example, device 102 and/or device 104 may include a station, e.g., in accordance with the 3GPP and/or 802.16 standards.

According to some demonstrative embodiments of the invention, device 102 may include a transmitter 102 to transmit wireless communication signals to device 104, e.g., over channel 110, for example, via one or more antennas 116. Device 104 may include a receiver 146 to receive the wireless communication signals via one or more antennas 108. Receiver 146 may include any suitable receiver, e.g., as is known in the art. Although the scope of the present invention is not limited in this respect, types of antennae that may be used for antennas 106 and/or 108 may include but are not limited to internal antenna, dipole antenna, omni-directional antenna, a monopole antenna, an end fed antenna, a circularly polarized antenna, a micro-strip antenna, a diversity antenna and the like.

According to some demonstrative embodiments of the invention, transmitter 112 may include a Base Band (BB) processor 114, an adjuster 128, a digital to analog (D/A) converter 142, and/or a frontend 144, as are all described in detail below.

According to some demonstrative embodiments of the invention, BB processor 114 may include any suitable BB processor able to generate, for example, based on input data 115, at least one wireless communication signal 126 intended for transmission e.g., as is known in the art. Wireless communication signal 126 may include, for example, a digital baseband signal, which may include modulated data corresponding to input data 115, e.g., as is known in the art. In one example, BB processor 114 may be adapted to generate signal 126 including a single-carrier (SC) wireless communication signal. In another example, BB processor 114 may be adapted to generate signal 126 including a multi-carrier (MC) wireless communication signal, e.g., an Orthogonal Frequency Division Modulation (OFDM) signal, or an Orthogonal Frequency Division Multiple Access (OFDMA) signal, as are known in the art.

According to some demonstrative embodiments of the invention, BB processor 114 may include, for example, a transformer 116 to apply to input data 115 a Direct Fourier Transformation (DFT), e.g., represented by a DFT matrix, denoted W, e.g., as is known in the art. BB processor 114 may also include a mapper 118 to allot one or more subcarriers to signal 126, e.g., as is known in the art. Processor 114 may also include a transformer 120 to generate signal 126 having a spectral range corresponding to the allotted subcarriers, e.g., using an Inverse Fast Fourier Transformation (IFFT), as is known in the art. Additionally or alternatively, processor 114 may include any other suitable BB processing module, unit and/or element, e.g., as are known in the art.

According to some demonstrative embodiments of the invention, adjuster 128 may adjust signal 126 using an adjustment signal to generate an adjusted wireless communication signal 140, e.g., as described in detail below. Adjuster 128 may be implemented, for example, as a hardware component, as a software component, as a combined hardware/software component, as part of BB processor 114, as a unit or sub-unit of device 102, as part of a Physical (PHY) layer, PHY module, or PHY component of device 102, as a communication driver, as a dedicated controller, as an Integrated Circuit (IC), or the like. In some embodiments, adjuster 128 may be operatively associated with, or may communicate with, one or more components of device 102, for example, BB processor 114, a PHY module, a PHY component, a PHY layer, other layers of device 102, or the like.

According to some demonstrative embodiments of the invention, adjuster 128 may include an allocator 130 to allocate a plurality of spectral components, e.g., tones, to the adjustment signal based on the spectral range of wireless communication signal 126. Allocator 130 may allocate the spectral components of the adjustment signal such that, for example, one or more of the spectral components of the adjustment signal may be included in the spectral range of wireless communication signal 126, e.g., as described below.

According to some demonstrative embodiments of the invention, signal 126 may include at least one block, denoted X, of N signal samples, denoted x(n), wherein n=0 ... N−1. Block X be generated by BB processor 114, for example, during a time period, denoted TB, e.g., TB=N/Fs, wherein Fs denotes a sampling frequency of samples in block X. It will be appreciated by those of ordinary skill in the art, that a spectral range R of the signal samples x(n) may be related, for example, to the rate Fs, e.g., $R \subset [-Fs, Fs]$. The spectral range R may be related to a support in a frequency domain of a signal spectrum, denoted S(f), of the signal samples, x(n). For example, the spectral range R may relate to a region along a frequency axis containing nonzero spectral components of the signal samples x(n), e.g., as follows:

$$R = \mathrm{supp}(S(f)) = \{f | S(f) \neq 0\} \quad (1)$$

According to some demonstrative embodiments of the invention, it may be assumed that the spectral range R may remain substantially unchanged at least during the time period TB such that, for example, at least one block has the spectral range R.

According to some demonstrative embodiments of the invention, adjuster 128 may adjust the block X using an adjustment signal, denoted c(n), having a spectrum, supp(C(f)), at least partially contained within the spectral range R, e.g., as described in detail below.

According to some demonstrative embodiments of the invention, the adjustment signal c(n) may be combined with the signal block X, e.g., by adding the adjustment signal c(n) to the signal block X, to generate adjusted signal 140. The adjustment signal c(n) may be determined such that, for example, one or more amplitude peaks of adjusted signal 140 are reduced compared to one or more respective amplitude peaks of signal 126. Accordingly, a Peak-to-Average-Power-Ratio (PAPR) of adjusted signal 140 may be reduced, e.g., compared to a PAPR of signal 126. It will be appreciated by those of ordinary skill in the art, that a spectrum utilization of adjusted signal 140 may be substantially unchanged, e.g., compared to a spectrum utilization of signal 126, for example, since the spectrum of the adjustment signal c(n) may be at least partially contained within the spectral range R of signal 126. Accordingly, adjusted signal 140 may result in substantially negligible interference to other communication links having adjacent or other spectral ranges. According to some demonstrative embodiments of the invention, adjuster 128 may determine a power level to be provided to the adjustment signal c(n) such that the adjustment signal c(n) does not substantially distort signal 140. For example, adjuster 128 may provide the adjustment signal c(n) with a power level resulting in a distortion, which may be smaller, e.g., when reaching receiver 146, than a noise level generated at receiver 146.

According to some demonstrative embodiments of the invention, allocator 130 may determine one or more spectral components of the adjustment signal c(n) based on the spectral range R of signal 126. For example, allocator 130 may receive, e.g., from mapper 118, subcarrier mapping information 122 representing the subcarriers allotted to signal 126. Allocator 130 may determine the spectral range R, for example, based on mapping information 122. Allocator 130 may allocate a spectral range, denoted R', including one or more spectral components to adjustment signal c(n), e.g., based on the spectral range R of signal 126. For example, the spectral range R' of the adjustment signal may at least partially overlap the spectral range R of signal 126. An output 132 of allocator 130 may represent, for example, the spectral range R'.

According to one demonstrative embodiment of the invention, the range R' may substantially overlap with the entire spectral range R, e.g., R'=R. Accordingly, the spectral components allocated to the adjustment signal c(n) may include all spectral components of signal 126.

According to another demonstrative embodiments of the invention, the spectral range R' may be included within part of the spectral range R, and may be smaller than the spectral range R. Accordingly, one or more spectral components of signal 126 may be allocated to the adjustment signal c(n), and one or more spectral components of signal 126 may not be allocated to the adjustment signal c(n).

According to yet another demonstrative embodiment of the invention, the spectral range R' may be larger than the spectral range R. For example, the spectral range R' may include one or more spectral components of the spectral range R, and one or more spectral components not included in the spectral range R. Accordingly, one or more spectral components allocated to the adjustment signal c(n) may not be included in the spectral range R of signal 126.

According to some demonstrative embodiments of the invention, adjuster 128 may also include a kernel generator 134 to generate a kernel 136 based on output 132. Kernel generator 134 may include, for example, any suitable kernel generator to generate a PAPR kernel 136, e.g., as is known in the art.

According to some demonstrative embodiments of the invention, the PAPR kernel may be determined by applying an inverse, e.g., normalized, DFT including, for example, a vector of all-ones projected onto the spectral range R'. For example, kernel generator 134 may generate PAPR kernel 136, denoted p(n), e.g., as follows:

$$p(n) = \frac{1}{U} \sum_{m=0}^{N-1} (W^{-1})_{nm} P(m) = \frac{1}{U} \sum_{m=0}^{N-1} P(m) e^{2\pi j mn/N} \quad (2)$$

wherein:

$$P(m) = \begin{cases} 1 & \text{if } m \in R' \\ 0 & \text{otherwise} \end{cases} \quad (3)$$

and wherein U may denote a number of used "frequency bins", e.g., as follows:

$$U = \sum_{m=0}^{N-1} P(m) \quad (4)$$

It will be appreciated by a person of ordinary skill in the art that according to Equation 2, the kernel p(n) may have a value of one if n=0, and p(n≠0)≈0, wherein the value of p(n) may approach zero as the value of U approaches the number of samples N. It will also be appreciated by a person of ordinary skill in the art that a cyclic shift of the kernel, e.g., $\{p(n)=p_0(n)\} \mapsto \{p_k(n)=p((n-k) \bmod N)\}$, may result in an approximate impulse signal centered around the time n=k, without, for example, changing the spectral support of the kernel p, e.g., while affecting the phases of the spectral components of the kernel p(n).

According to some demonstrative embodiments of the invention, adjuster 128 may also include a PAPR adjuster 138 to generate adjusted signal 140 by applying a PAPR adjustment operation to signal 126, e.g., using the kernel p(n). For example, PAPR adjuster 138 may determine the adjustment signal c(n), e.g., based on the kernel p(n); and/or adjust signal 126 using the adjustment signal c(n) to generate adjusted signal 140, e.g., as described below.

According to some demonstrative embodiments of the invention, PAPR adjuster 138 may generate the adjusted signal, denoted x'(n), corresponding to the signal x(n), for example, by performing a predefined number, denoted M, of iterative calculations, e.g., according to the following algorithm:

0. Initialize the iterations, indexed by i, by setting i=0 and $x^{i=0}(n) = x(n)$.
1. Repeat steps 1a-1c below as long as i<M:
   a. Find the locations of amplitude peaks of $x^i(n)$, namely the set of indices $\{n_k\} = \{n | |x^i(n)| > A\}$.
   b. If $\{n_k\} = \emptyset$, go to step 2. Otherwise, set: $x^{i+1}(n) = x^i(n) - \epsilon \sum_k \alpha_k p_{n_k}(n)$, where $\alpha_k = [1 - A/|x^i(n)|] x^i(n)$.
   c. Increment the iteration index $i \mapsto i+1$.
2. Set the output according to:

$$x'(n) = \begin{cases} x^i(n) & \text{if } \max_n |x^i(n)| < \max_n |x^0(n)| \\ x^0(n) & \text{otherwise} \end{cases} \quad \text{Algorithm 1}$$

wherein A denotes a predefined, e.g., positive, target clipping threshold, and ε denotes a predefined, e.g., positive, update step size.

According to some demonstrative embodiments of the invention, the number of iterations M, the update step size ε, and/or the target clipping threshold A may be updated based on one or more attributes of signal 126, e.g., the specific values of N and/or U; and/or any other attributes of transmitter 112 and/or receiver 146, e.g., a non-linearity of transmitter 112, and/or a sensitivity of receiver 146, as are known in the art. Any suitable modifications may be made to Algorithm 1, e.g., in order to improve a convergence rate and/or a stability of Algorithm 1; and/or to reduce memory and/or computational requirements.

According to some demonstrative embodiments of the invention, D/A 142 may include any suitable converter to convert signal 140 into an analog signal 148, e.g., as is known in the art. Frontend 144 may include any suitable frontend module, component, element, and/or unit to transmit signal 148 via antenna 106, e.g., as is known in the art.

Figure 2:
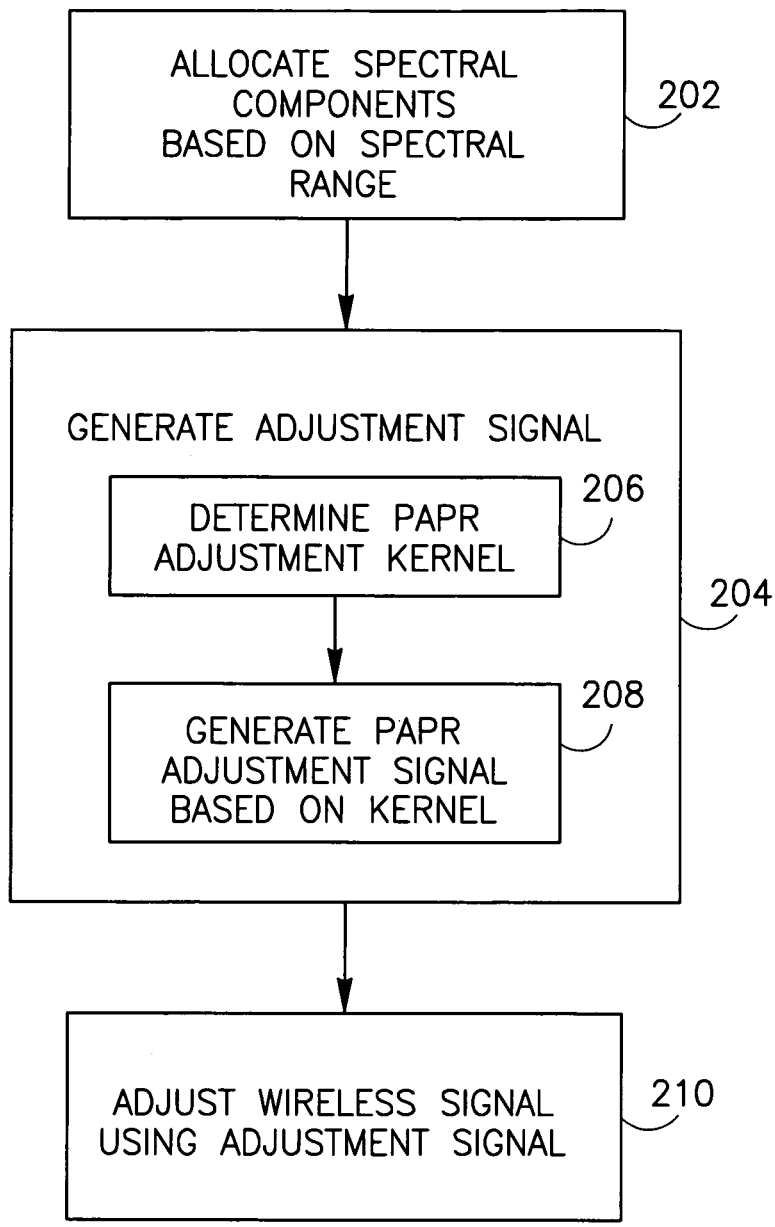
FIG. 2 is a schematic flow-chart illustration of a method of adjusting a wireless communication signal in accordance with some demonstrative embodiments of the invention.

Reference is now made to FIG. 2, which schematically illustrates a method of adjusting a wireless communication signal in accordance with some demonstrative embodiments of the invention. Although the invention is not limited in this respect, one or more operations of the method of FIG. 2 may be implemented, for example, by system 100 of FIG. 1, by device 100 of FIG. 1, by processor 114 of FIG. 1, by adjuster 128 of FIG. 1, by allocator 130 of FIG. 1, by kernel generator 134 of FIG. 1, by PAPR adjuster 138 of FIG. 1, and/or by other suitable transmitters, units, devices, and/or systems.

As indicated at block 202, the method may include, for example, allocating a plurality of spectral components, e.g., tones, to an adjustment signal based on a spectral range of a wireless communication signal to be adjusted by the adjustment signal. Although the invention is not limited in this respect, one or more of the spectral components may be included, for example, in the spectral range of the wireless communication signal. This may be performed, for example, by allocator 130 (FIG. 1), e.g., as described above.

As indicated at block 204, the method may also include according to some demonstrative embodiments of the invention, generating the adjustment signal. This may be performed, for example, by adjuster 128 (FIG. 1) and/or PAPR adjuster 138 (FIG. 1), e.g., as described above.

According to some demonstrative embodiments of the invention, as indicated at block 206, generating the adjustment signal may include, for example, determining a PAPR kernel, e.g., based corresponding to the signal to be adjusted and/or the allocated spectral components. For example, kernel generator 134 (FIG. 1) may determine the kernel p(n), e.g., based on the spectral range R' and/or signal 126, e.g., as described above. As indicated at block 208, generating the adjustment signal may also include, for example, generating a PAPR adjustment signal based on the kernel. This may be performed, for example, by PAPR adjuster 138 (FIG. 1), e.g., as described above.

As indicated at block 210, the method may also include, for example, adjusting the wireless communication signal using the adjustment signal to generate an adjusted wireless communication signal. This may be performed, for example, by adjuster 128 (FIG. 1) and/or PAPR adjuster 138 (FIG. 1), e.g., as described above.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
    receiving information representing a spectral range of an input signal to be adjusted by an adjustment signal; and
    allocating a plurality of spectral components to the adjustment signal based on the spectral range of the input signal, such that the spectral components, which are allocated to the adjustment signal, are included in the spectral range of the input signal.

2. The method of claim 1, wherein allocating the plurality of spectral components comprises allocating the spectral components to a peak-to-average-power-ratio adjustment signal, and wherein the information representing the spectral range of the input signal includes mapping information representing subcarriers allotted to the input signal.

3. The method of claim 2 comprising:
    determining a peak-to-average-power-ratio kernel based on said spectral components; and
    generating said peak-to-average-power-ratio adjustment signal based on said kernel.

4. The method of claim 1, wherein the input signal includes a wireless communication signal, the method comprising adjusting said wireless communication signal using said adjustment signal to generate an adjusted wireless communication signal.

5. The method of claim 4, wherein adjusting said wireless communication signal comprises adjusting a single-carrier wireless communication signal using said adjustment signal to generate an adjusted single-carrier wireless communication signal.

6. The method of claim 4, wherein adjusting said wireless communication signal comprises adjusting a multi-carrier wireless communication signal using said adjustment signal to generate an adjusted multi-carrier wireless communication signal.

7. The method of claim 4, wherein adjusting said wireless communication signal comprises adjusting a digital baseband signal using said adjustment signal to generate an adjusted digital baseband signal.

8. The method of claim 1, wherein the spectral components, which are allocated to the adjustment signal, include one or more spectral components, which are allotted to the input signal.

9. An apparatus comprising:
    an allocator to allocate a plurality of spectral components to an adjustment signal,
    wherein the allocator is to receive information representing a spectral range of an input signal to be adjusted by the adjustment signal,
    and wherein the allocator is to allocate the plurality of spectral components to the adjustment signal based on the spectral range of the input signal to be adjusted by said adjustment signal, such that the spectral components, which are allocated to the adjustment signal, are included in the spectral range of the input signal.

10. The apparatus of claim 9, wherein said adjustment signal comprises a peak-to-average-power-ratio adjustment signal, and wherein the information representing the spectral range of the input signal includes mapping information representing subcarriers allotted to the input signal.

11. The apparatus of claim 10 comprising:
a kernel generator to determine a peak-to-average-power-ratio kernel based on said spectral components; and
an adjustment generator to generate said peak-to-average-power-ratio adjustment signal based on said kernel.

12. The apparatus of claim 9, wherein the input signal includes a wireless communication signal, the apparatus comprising a signal adjuster to generate an adjusted wireless communication signal by adjusting said wireless communication signal using said adjustment signal.

13. The apparatus of claim 12, wherein said wireless communication signal comprises a single-carrier wireless communication signal, and wherein said adjusted wireless communication signal comprises an adjusted single-carrier wireless communication signal.

14. The apparatus of claim 12, wherein said wireless communication signal comprises a multi-carrier wireless communication signal, and wherein said adjusted wireless communication signal comprises an adjusted multi-carrier wireless communication signal.

15. The apparatus of claim 12, wherein the spectral components, which are allocated to the adjustment signal, include one or more spectral components, which are allotted to the input signal.

16. The apparatus of claim 12, wherein said wireless communication signal comprises a digital baseband signal, and wherein said adjusted wireless communication signal comprises an adjusted digital baseband signal.

17. A wireless communication system comprising:
a wireless station including:
an allocator to allocate a plurality of spectral components to an adjustment signal, wherein the allocator is to receive information representing a spectral range of an input signal to be adjusted by the adjustment signal, and wherein the allocator is to allocate the plurality of spectral components to the adjustment signal based on the spectral range of the input signal to be adjusted by said adjustment signal, such that the spectral components, which are allocated to the adjustment signal, are included in the spectral range of the input signal;
an adjuster to generate an adjusted wireless communication signal by adjusting said input signal using said adjustment signal; and
at least one antenna to transmit said adjusted wireless communication signal.

18. The system of claim 17, wherein said adjustment signal comprises a peak-to-average-power-ratio adjustment signal, and wherein the information representing the spectral range of the input signal includes mapping information representing subcarriers allotted to the input signal.

19. The system of claim 18, wherein said station comprises:
a kernel generator to determine a peak-to-average-power-ratio kernel based on said spectral components; and
an adjustment generator to generate said peak-to-average-power-ratio adjustment signal based on said kernel.

20. The system of claim 17, wherein said input signal comprises a single-carrier wireless communication signal, and wherein said adjusted wireless communication signal comprises an adjusted single-carrier wireless communication signal.

21. The system of claim 17, wherein the spectral components, which are allocated to the adjustment signal, include one or more spectral components, which are allotted to the input signal.

* * * * *